United States Patent [19]

Schricker

[11] Patent Number: 5,787,378
[45] Date of Patent: Jul. 28, 1998

[54] METHOD FOR DETERMINING THE RESISTANCE FACTOR OF AN EARTHMOVING MACHINE TO DETECT AN ABNORMAL CONDITION

[75] Inventor: David R. Schricker, Princeville, Ill.

[73] Assignee: Caterpillar Inc., Peoria, Ill.

[21] Appl. No.: 617,525

[22] Filed: Mar. 15, 1996

[51] Int. Cl.$^6$ .................. B60S 5/00; G08B 23/00
[52] U.S. Cl. .................. 701/50; 701/29; 701/35; 340/438; 340/442
[58] Field of Search .............. 364/424.07, 424.034, 364/424.04, 424.082, 551.01, 567, 424.083; 340/425.5, 438, 442, 679; 701/50, 29, 35, 53, 54

[56] References Cited

U.S. PATENT DOCUMENTS 5,463,567  10/1995  Boen et al. .................. 364/551.01
5,465,208  11/1995  Mochizuki et al. .............. 364/426.01
5,561,610  10/1996  Schricker et al. .................. 340/679

Primary Examiner—Tan Q. Nguyen
Attorney, Agent, or Firm—David M. Masterson

[57] ABSTRACT

A method for detecting an abnormal condition in one mobile machine in a fleet of like mobile machines is provided. The one mobile machine travels from a first point (A) to a second (B). The method includes the steps of determining an average fleet resistance factor for the fleet and sensing via onboard sensors a plurality of parameters of the one mobile machine as it travels from A to B and determining a current machine resistance factor. The average fleet resistance and the current machine resistance factor are compared and the abnormal condition is detected.

8 Claims, 4 Drawing Sheets

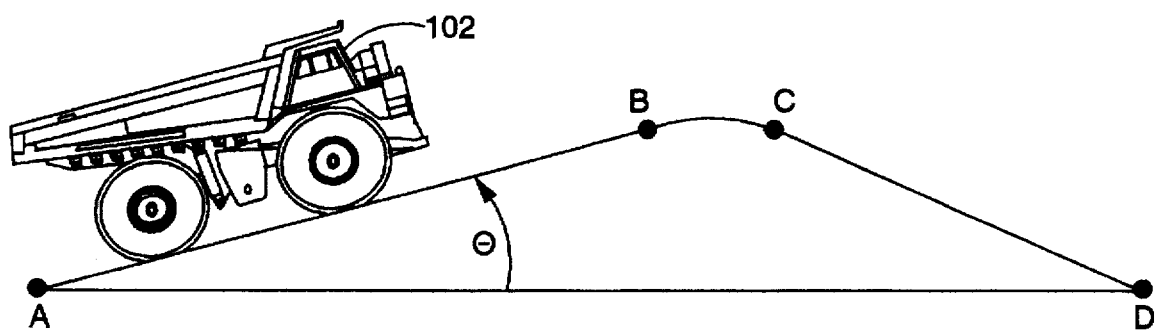
Fig_1_
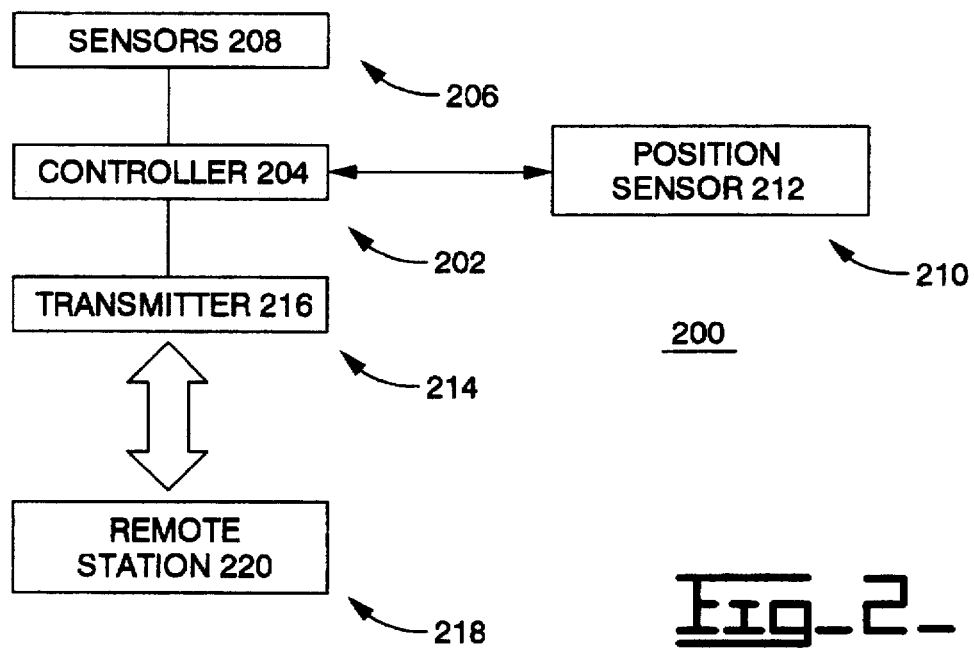
Fig_2_

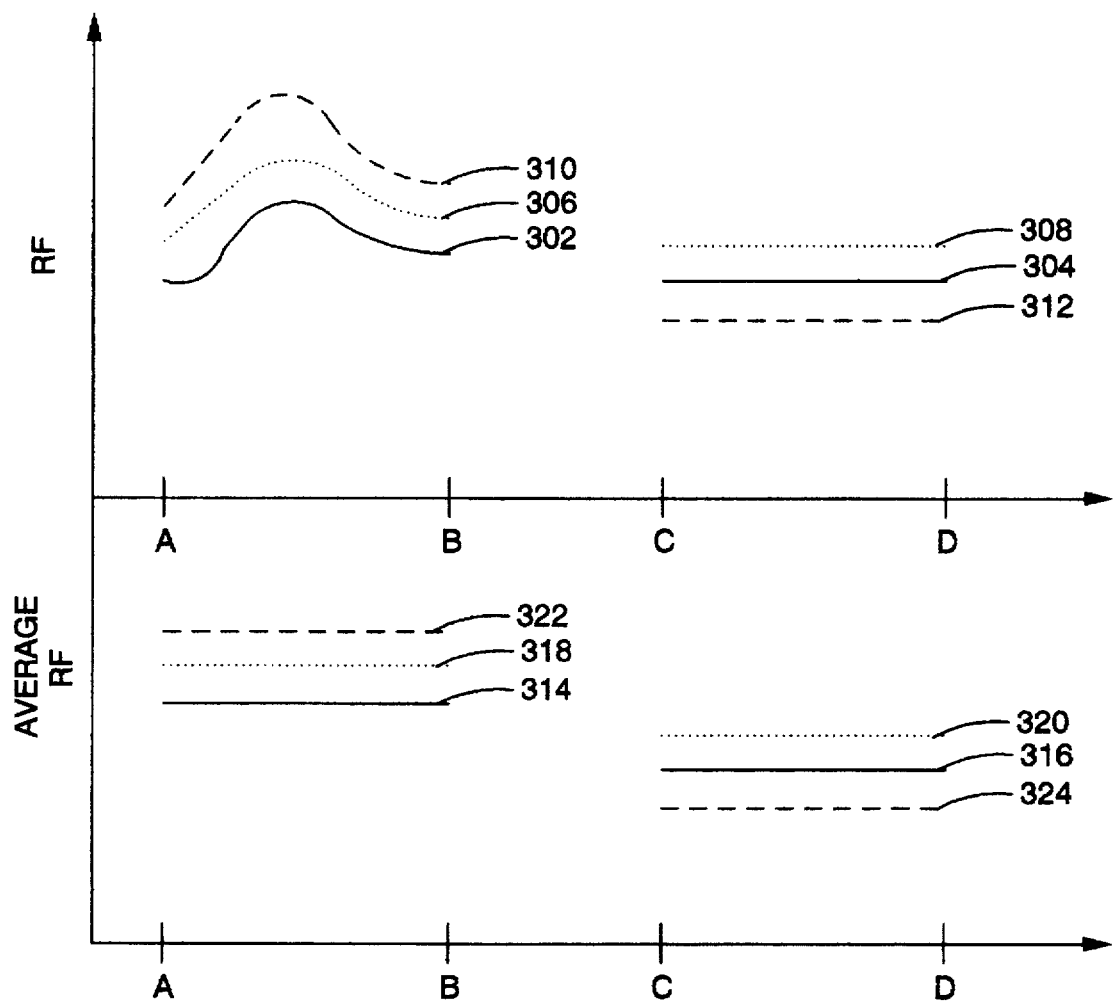
Fig_3_

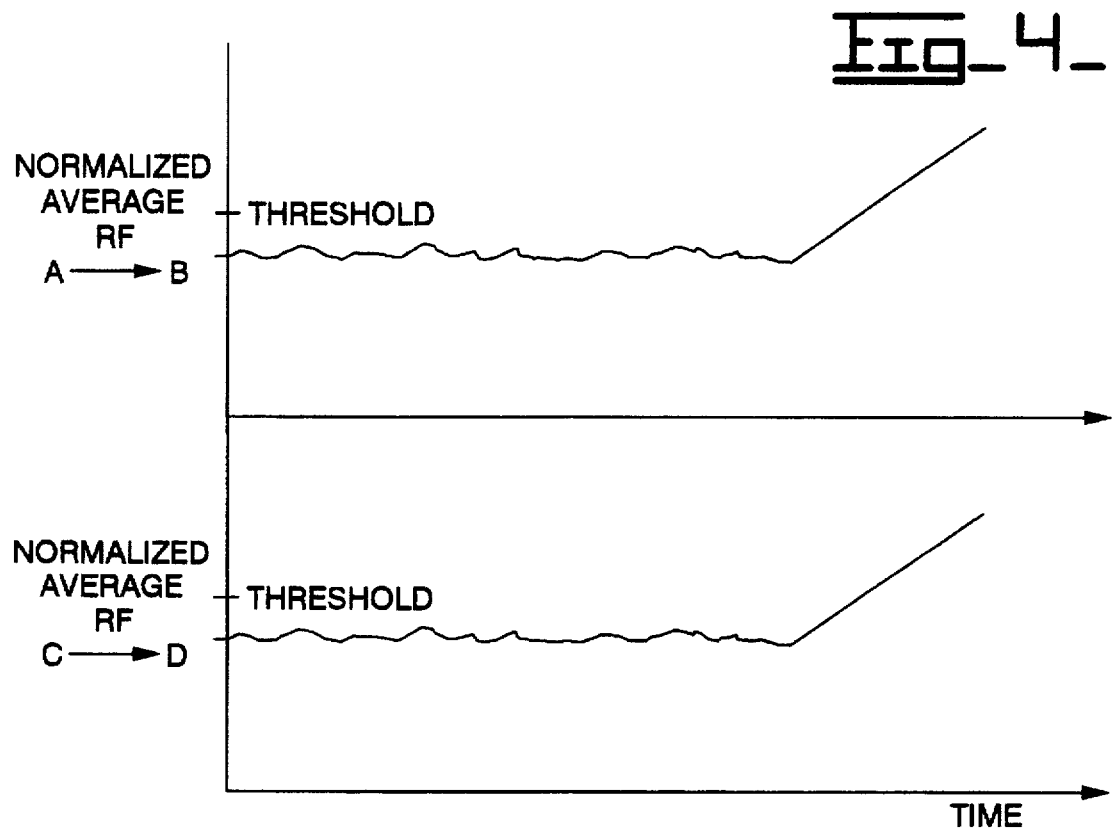
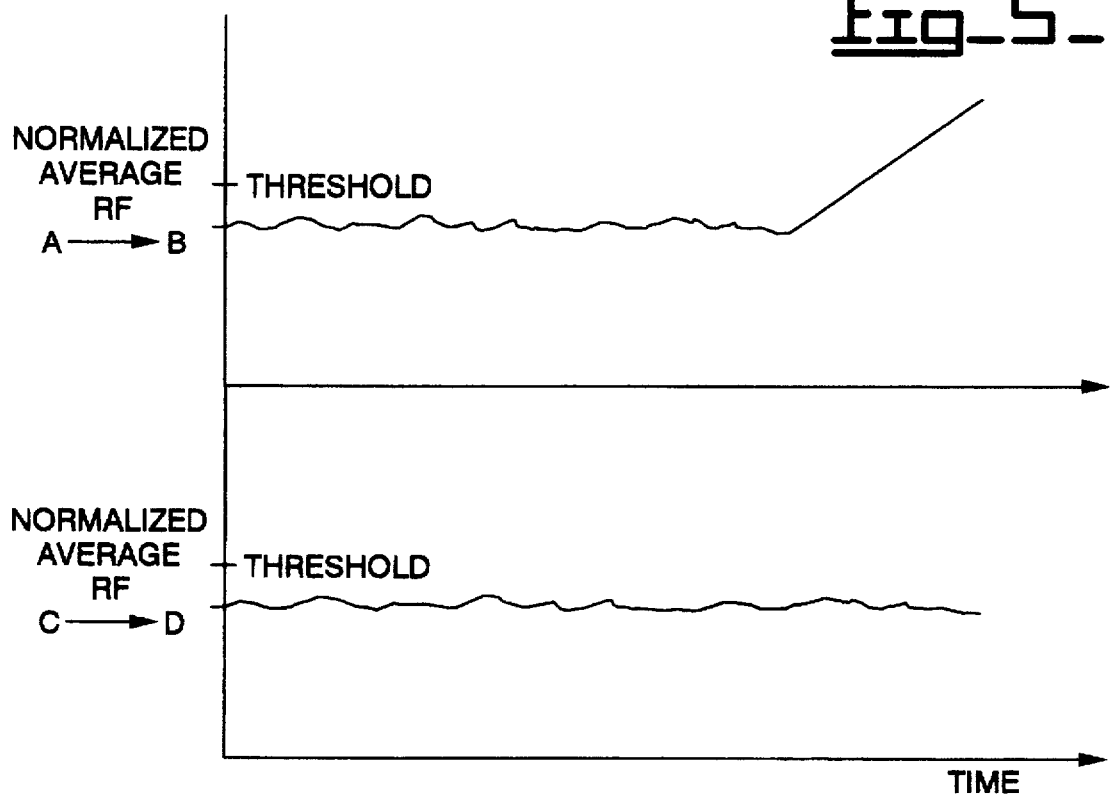

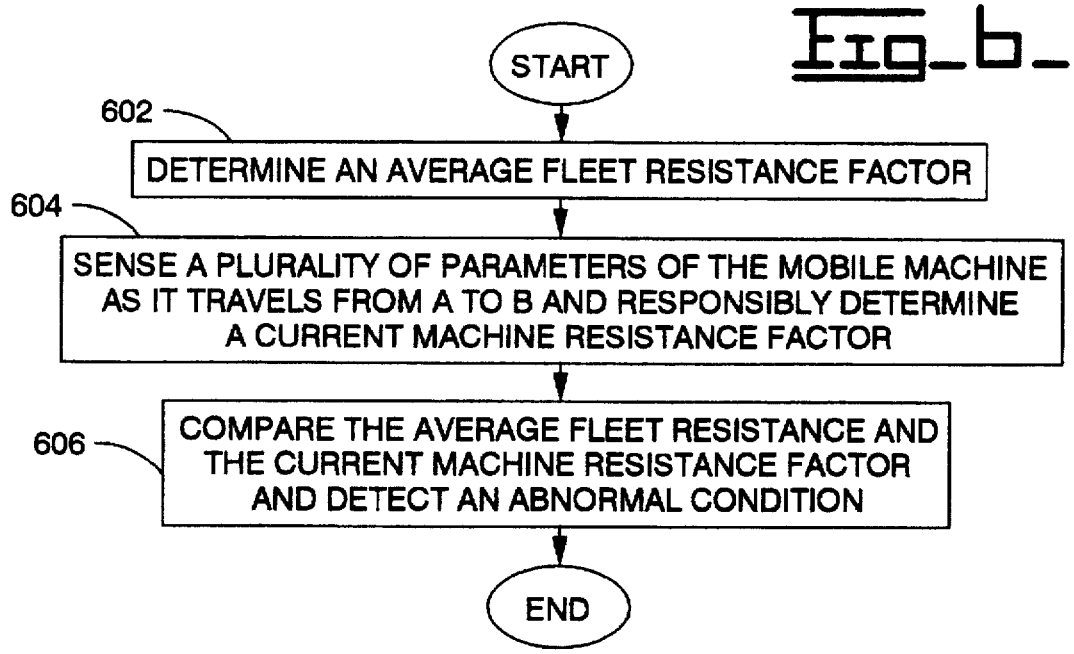
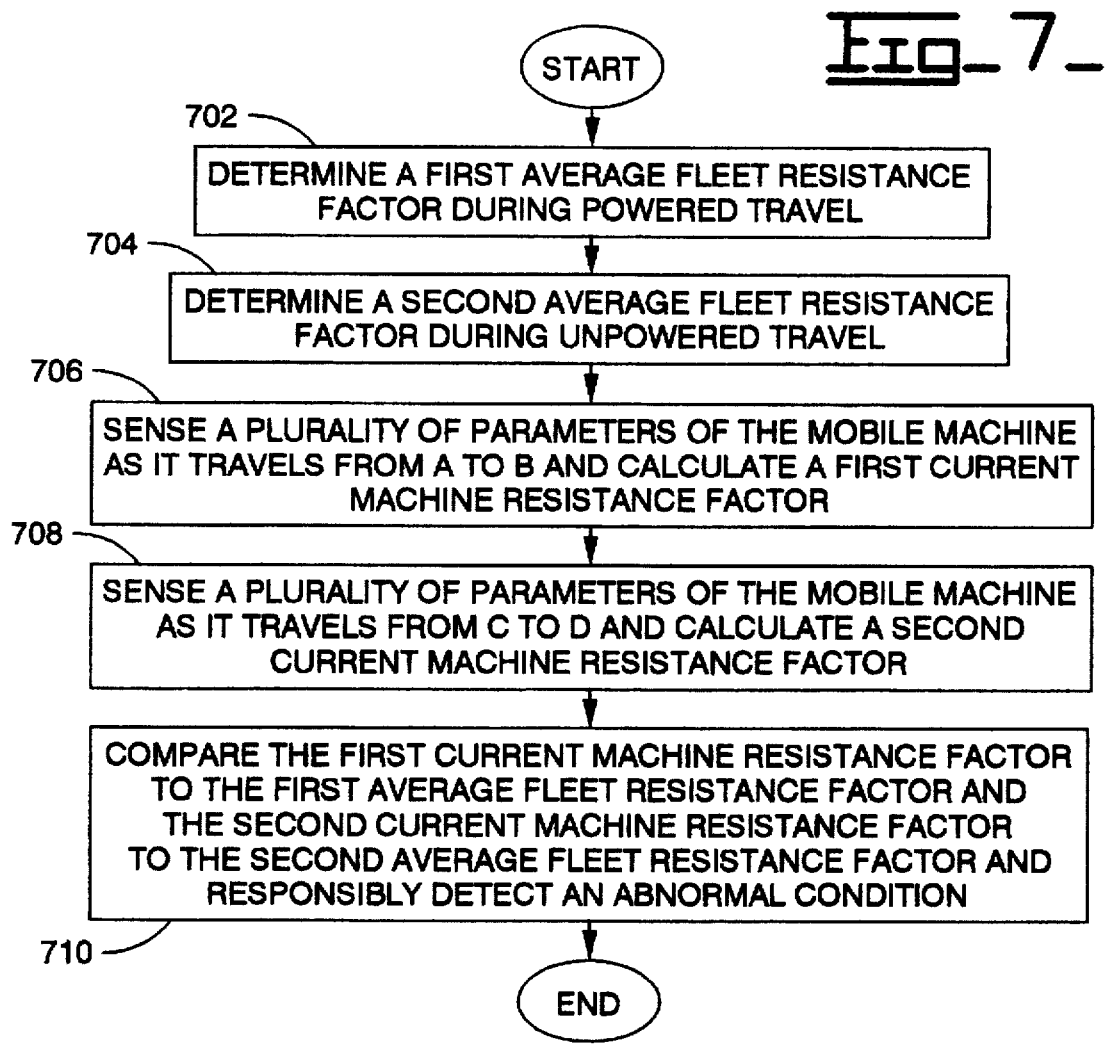

5,787,378

METHOD FOR DETERMINING THE RESISTANCE FACTOR OF AN EARTHMOVING MACHINE TO DETECT AN ABNORMAL CONDITION

DESCRIPTION

1. Technical Field

The present invention relates generally to an earthmoving machine, and more particularly, to a method for determining a resistance factor in order to detect an abnormal condition.

2. Background Art

Electronic control modules and information systems are becoming key components on earthmoving machines. Electronic control modules typically include a plurality of sensors and a microprocessor based control module adapted to control a machine component.

Typical electronic control modules on earthmoving machines control operation of the engine or transmission. Information systems are also used to collect data relating to the operation of the earthmoving machine and to store the data and/or display the data to the operator.

The data being collected presents a previously unknown opportunity to diagnose and/or monitor in real time the operation of the machine which normally have to be accomplished manually.

The present invention is aimed at one or more the problems identified above.

DISCLOSURE OF THE INVENTION

In one aspect of the present invention, a method for detecting an abnormal condition in one mobile machine in a fleet of like mobile machines is provided. The one mobile machine travels from a first point (A) to a second point (B). The method includes the steps of determining an average fleet resistance factor, sensing, via onboard sensors, a plurality of parameters of the one mobile machine as it travels from A to B and responsively determining a current machine resistance factor. The method further includes the step of comparing the average fleet resistance factor and a current machine resistance factor and responsively detecting the abnormal condition.

In an other aspect of the present invention, a method for detecting an abnormal condition in one mobile machine in a fleet of like mobile machines is provided. The one mobile machine travels from a first point A to a second point B and to a third point C to a fourth D. The travel of the mobile machine from A to B is powered and the travel from C to D is unpowered. The method includes the steps of determining a first average fleet resistance factor during power travel and determining a second average fleet resistance factor during unpowered travel. A plurality of parameters of the one mobile machine are sensed as it travels from A to B via onboard sensors and a first current mobile machine resistance factor is calculated. A plurality of parameters of the one mobile machine as it travels from C to D are sensed and a second current mobile machine resistance factor is calculated. The first current mobile machine resistance factor is compared to the first average fleet resistance factor and the second current mobile machine resistance factor is compared to the second average fleet resistance factor and the abnormal condition is detected in response thereof.

BRIEF DESCRIPTION OF THE DRAWINGS

FIG. 1 is a side view graphical illustration of an earthmoving machine shown as an off-highway truck as it traverses from points A to B and C to D;

FIG. 2 is a block diagram of an apparatus for implementing the present invention;

FIG. 3 is a graph illustrating an example of the resistance factor and the average resistance factor as the mobile machine travels from A to B to C and to D;

FIG. 4 is a graph illustrating average resistance factor as the mobile machine travels from A to B and from C to D, under one type of abnormal condition is detected;

FIG. 5 is a graph illustrating average resistance factor when the mobile machine travels from A to B and from C to D under a second type of abnormal condition;

FIG. 6 is a flow diagram illustrating a method for detecting an abnormal condition of a mobile machine, according to an embodiment of the present invention; and, FIG. 7 is a flow diagram illustrating a method for detecting an abnormal condition of a mobile machine, according to an other embodiment of the present invention.

BEST MODE FOR CARRYING OUT THE INVENTION

With reference to FIG. 1, the present invention is adapted to provide a method for automatically detecting an abnormal condition of a mobile machine as it travels along a path. In one embodiment, the method automatically detects an abnormal condition of a mobile machine as it travels from a first point (A) to a second point (B). In an other embodiment, the method automatically detects an abnormal condition of a mobile machine as it travels from a first point (A) to a second point (B) and from a third point (C) to a fourth point (D).

In the preferred embodiment, the mobile machine 102 is shown as a off-highway truck. However, other similar machines may be used without departing from the spirit of the invention. The points A,B,C,D, may be anywhere along the planned path of the mobile machine 102.

The points are picked such that the travel of the mobile machine 102 from A to B is powered and the travel from points from C to D is unpowered. This may be either assumed based on the slope of the path segments or measured based on engine load, i.e. a path segment is said to be powered if the engine load is greater than a predetermined value and a path segment is said to be unpowered if the engine load is less than a predetermined value. Additionally, it should be noted that the path segment from A to B and the path segment from C to D may be anywhere along the planned path of the machine and need not be located in close proximity to each other. However, it is also possible that points B and C are the same.

With reference to FIG. 2, the present invention is implemented via a controlling means 202. In the preferred embodiment, the controlling means 202 includes a microprocessor controller 204.

A sensing means 206, which includes a plurality of sensor 208, senses a plurality of parameters of the earthmoving machine 102 as it traverses the path.

A positioning means 210 determines the position of the earthmoving machine 102. The positioning means 210 includes a position sensor which in the preferred embodiment includes a Global Positioning System (GPS) receiver (not shown). The GPS receiver receives signals from satellites and responsively determines the position of the receiver. It should be noted that other positioning sensors, for example, laser based systems, may be used without departing from the spirit of the invention.

Data from the earthmoving machine 102 may be delivered to a remote location 218 or remote station 220 via a transmitting means 214. The transmitting means 214 preferably includes a transmitter 216.

As discussed below, the present invention provides a method for detecting an abnormal condition of the mobile machine. This is accomplished through the calculation of a resistance factor (RF). The resistance factor has two components: rolling resistance (RR) and SLOPE. The rolling resistance is attributed to the force applied to the mobile machine 102 by the road surface and tire deflection and the SLOPE is attributed to the slope of the grade of the path segment.

With reference to FIG. 3 in the top portion of the graph, a sample resistance factor (RF) is illustrated for a path segment from A to B and a path segment from C to D.

The lines 302 and 304 represent the resistance factor under normal operating conditions.

In the preferred embodiment, the present invention is adapted to detect either a under-inflated tire or a low power condition of the engine of the mobile machine 102. Thus, in the top portion of the graph of FIG. 3, the dotted lines 306, 308 represent a possible under-inflated tire. The dashed line segments 310, 312 represent a low power condition of the engine. The line segments in the top portion of the graph represent the instantaneous resistance factor between the points under those operating conditions. In the lower portion of the graph of FIG. 3, the lines represent the average resistance factor for that path segment. Thus, the solid lines 314, 316 represent the average resistance factor between points A and B and points C to D respectively, under normal operating conditions. The dotted lines 318, 320 represent the average resistance factors from points A to B and C to D under the condition of an under-inflated tire. The dashed lines 322,324 represent the average resistance factors from points A to B and C to D, respectively, under the condition of an under-inflated tire.

With reference to FIG. 6, a flow diagram of the present invention is illustrated according to a first embodiment.

In a first control block 602, an average fleet resistance factor is determined. The average fleet resistance factor is determined as a function of the resistance factors for a fleet of like mobile machines. The average fleet resistance factor may be determined as a function of the resistance factors for the machines in the fleet for one or more path segments of the machine's predetermined path.

In another embodiment, the average fleet resistance factor is continually updated. For example, the average fleet resistance factor may be determined as a function of the resistance factors determined for each machine in the fleet while traveling from point A to point B.

In a second control block 604, a plurality of parameters of the mobile machine are sensed as it travels from A to B. A current machine resistance factor is determined as a function of the plurality of parameters of the mobile machine. In a third control block 606, the average fleet resistance factor and the current machine resistance factor are compared and an abnormal condition is detected.

With reference to FIG. 7, a flow diagram of the present invention according to a second embodiment is illustrated. In the second embodiment, the abnormal condition may be either an under-inflated tire or a low powered engine. First and second resistance factors are determined corresponding to a first path segment from a first point (A) to a second point (B) and a path segment from a third point (C) to a fourth point (D), respectively. The path segment A to B, is powered and the path segment from C to D is unpowered.

In a fourth control block 702, a first average fleet resistance factor is determined during powered travel.

In a fifth control block 704, a second average fleet resistance factor during unpowered travel is determined.

In one embodiment, the first and second average fleet resistance factors are calculated for all powered and unpowered segments of the path, respectively.

In another embodiment, the first and second average fleet resistance factors are calculated for predetermined powered and unpowered segments of the path, respectively.

In still another embodiment, the first and second average fleet resistance factors are calculated for the path segment from A to B and the path segment from C to D, respectively.

In a sixth control block 706, a plurality parameters of the mobile machine as it travels from A to B are sensed and a first current machine resistance factor is calculated.

In a seventh control block 708, a plurality of parameters of the mobile machine as it travels from C to D are sensed and a second current machine resistance factor is calculated.

The first and second current machine resistance factors are calculated by the following procedure.

First, the weight of the fuel in the fuel tank of the mobile machine 102 is determined according to Equation 1:

$$FW=FG/100*FC*FD*g \qquad \text{Equation 1}$$

where FW represents the fuel weight, FG represents the signal received from a fuel gauge, FC represents the fuel capacity of the mobile machine 102, FD represents the fuel density of the fuel being used, and g represents the gravitational constant. FC, FD, and g are constants.

The gross vehicle weight (GVW) is then determined by:

$$GVW=EVW+FW+PW \qquad \text{Equation 2}$$

where EVW represents the empty vehicle weigh and PW represents the weight of the payload being carried by the mobile machine 102. EVW is a constant and PW determined by a sensor.

The net rimpull is determined by the equation:

$$NRP=DLRP-BRKP \qquad \text{Equation 3}$$

where DLRP represents the drivetrain rimpull and BRKP represents the braking power. Drivetrain rimpull and braking power may be determined directly by sensors or may be determined by computer based models using other sensor information.

The wind resistance is determined by the equation:

$$WR=CD \cdot (VSPD)^2 \qquad \text{Equation 4}$$

where VSPD represents the speed of the machine and is determined by a sensor and CD represents the coefficient of drag of the mobile machine and is a constant.

The acceleration of the mobile machine (VACC) is determined as the time derivative of the machine speed.

The resistance factor (RF) is then determined by the equation:

$$RF = \frac{NRP - WR}{GVW} - \frac{VACC}{g} \qquad \text{Equation 5}$$

As stated previously, the resistance factor includes both a rolling factor and a slope. Therefore, the resistance factor as described above is a total resistance factor (TRF). The resistance factor (RF) may also be the rolling resistance factor (RRF). Therefore, the slope component must be subtracted from the total resistance factor. The slope is equal to the sine of the angle of the path segment as shown in FIG. 1. The angle θ, may be predetermined and a constant or calculated based on the position of the point A and the position of the point B as determined by the positioning means 210. Thus, the rolling resistance factor is calculated by the equation:

$$RRF = TRF - \text{SLOPE} = \frac{NRP - WR}{GVW} - \frac{VACC}{g} - \text{SINE}(\theta) \qquad \text{Equation 6}$$

Returning to FIG. 7, in an eighth control block 710, the first current machine resistance factor is compared to the first average fleet resistance factor and the second current machine resistance is compared to the second average fleet resistance factor and an abnormal condition is detected.

With reference to FIGS. 4 and 5, the first and second average resistance factors are normalized based on the first and second average fleet resistance factors, respectively. The normalized averages are compared with predetermined thresholds.

With particular reference to FIG. 4, under the condition of an under-inflated tire, both the average resistance factor during powered and unpowered travel will increase. If both the first and second average resistance factors are greater than the threshold, then an under-inflated tire condition is said to exist.

With particular reference to FIG. 5, the first and second normalized average resistance factors are compared with thresholds. As shown in FIG. 5 under the condition of a low powered engine, the normalized resistance factor from A to B will increase while the normalized resistance factor from C to D will not. Thus, if the first normalized average resistance factor is greater than the threshold and the second normalized average resistance factor is less than the threshold, then a low powered engine condition is said to exist.

INDUSTRIAL APPLICABILITY

With reference to the drawings and in operation, the present invention is adapted to provide a method for automatically and in real time detect an abnormal condition of an earthmoving machine as it traverses a path.

As the earthmoving machine travels between a series of predetermined points along the path, a plurality of parameters of the earthmoving machine are sensed. The parameters are used to calculate a resistance factor for the path segment. The calculated resistance factor is compared with an average resistance factor and an abnormal condition is responsively detected.

Operation of the present invention may be invisible to the operator. Data is sensed and determined during operation and the abnormal condition is detected (when present). The data may be stored onboard and/or displayed to the operator. Additionally, the data may also be transported offboard via a communication link or transported manually for detection of the abnormal condition.

Other aspects, objects, and features of the present invention can be obtained from a study of the drawings, the disclosure, and the appended claims.

I claim:

1. A method for detecting an abnormal condition in one mobile machine in a fleet of like mobile machines, the one mobile machine moving from a first point (A) to a second point (B), comprising:

(1) determining an average fleet resistance factor for the fleet;

(2) sensing, via onboard sensors, a plurality of parameters of the one mobile machine as it travels from A to B, and responsibly determining a current machine resistance factor; and, (3) comparing said average fleet resistance factor and said current machine resistance factor and responsively detecting the abnormal condition.

2. A method, as set forth in claim 1, wherein the abnormal condition is an under inflated tire.

3. A method, as set forth in claim 1, wherein the abnormal condition is low engine power.

4. A method, as set forth in claim 1, including the step of sensing a plurality of parameters and wherein said current machine average resistance factor is a function thereof.

5. A method, as set forth in claim 1, wherein said current machine average resistance factor is a total resistance factor.

6. A method, as set forth in claim 1, wherein said current machine average resistance factor is a rolling resistance factor.

7. A method for detecting an abnormal condition in one mobile machine in a fleet of like mobile machines, the one mobile machine traversing from a first point (A) to a second point (B) and from a third point (C) to a fourth point (D), wherein travel from A to B is powered and travel from C to D is unpowered, comprising:

determining a first average fleet resistance factor during powered travel;

determining a second average fleet resistance factor during unpowered travel;

sensing, via onboard sensors, a plurality of parameters of the one mobile machine as it travels from A to B, and responsibly calculating a first current mobile machine resistance factor;

sensing, via onboard sensors, a plurality of parameters of the one mobile machine as it travels from C to D, and responsibly calculating a second current mobile machine resistance factor; and, comparing said first current mobile machine resistance factor to said first average fleet resistance factor and said second current mobile machine resistance factor to said second average fleet resistance factor and responsibly detecting the abnormal condition.

8. A method for detecting an abnormal condition in one mobile machine in a fleet of like mobile machines, the one mobile machine traveling from a first point (A) to a second point (B), comprising:

sensing the amount of fuel within the mobile machine and the weight of a payload of the machine and responsibly determining the gross weight of the mobile machine as travels from A to B;

sensing a parameter of the mobile machine as travels from A to B and responsibly determining a net rimpull;

sensing a speed of the mobile machine as travels from A to B and responsibly determining a wind resistance;

calculating a current resistance factor as a function of the gross weight, net rimpull, and wind resistance; and, comparing the resistance factor with an average fleet resistance factor and responsibly detecting the abnormal condition.

* * * * *